US010247017B2

(12) United States Patent
Miller et al.

(10) Patent No.: US 10,247,017 B2
(45) Date of Patent: Apr. 2, 2019

(54) SYSTEM AND METHOD FOR GAS BEARING SUPPORT OF TURBINE

(71) Applicant: General Electric Company, Schenectady, NY (US)

(72) Inventors: Brandon Wayne Miller, Liberty Township, OH (US); Thomas Lee Becker, Cincinnati, OH (US); Daniel Alan Niergarth, Norwood, OH (US); Bugra Han Ertas, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 374 days.

(21) Appl. No.: 15/197,254

(22) Filed: Jun. 29, 2016

(65) Prior Publication Data
US 2018/0003064 A1    Jan. 4, 2018

(51) Int. Cl.
*F01D 1/00*    (2006.01)
*F01D 9/04*    (2006.01)
*F16C 32/06*    (2006.01)
*F01D 25/16*    (2006.01)
*F02C 3/04*    (2006.01)
(Continued)

(52) U.S. Cl.
CPC ............. *F01D 9/04* (2013.01); *F01D 25/16* (2013.01); *F02C 3/04* (2013.01); *F02C 7/18* (2013.01); *F16C 32/0622* (2013.01); *F05D 2220/32* (2013.01); *F05D 2240/35* (2013.01); *F05D 2240/50* (2013.01); *F05D 2240/60* (2013.01); *F16C 27/02* (2013.01); *F16C 2360/23* (2013.01)

(58) Field of Classification Search
None
See application file for complete search history.

(56) References Cited

U.S. PATENT DOCUMENTS 3,844,110 A * 10/1974 Widlansky ............... F02C 7/06
                                                    60/39.08
3,934,947 A *  1/1976 Walter ................ F16C 32/0603
                                                    384/111
(Continued)

FOREIGN PATENT DOCUMENTS

WO    2014175969 A2    10/2014

OTHER PUBLICATIONS

Zalud, Todd, Gear Put a New Spin on Turbofan Performance, Nov. 5, 1998, Machine Design.*

(Continued)

*Primary Examiner* — Craig Kim
*Assistant Examiner* — Edwin Kang
(74) *Attorney, Agent, or Firm* — GE Global Patent Operation; Nitin Joshi

(57) ABSTRACT

A system includes a gas delivery disk coupled to a second shaft, wherein the second shaft and the gas delivery disk are disposed about an axis. The gas delivery disk includes an inner axial opening configured to facilitate a first axial flow through a first passage within the second shaft, a duct configured to supply a bearing flow in a radial direction toward the axis, and a bearing face disposed within the first passage and radially interior to the inner axial opening. The bearing face is configured to receive the bearing flow, and the bearing face is configured to form a gas bearing between the bearing face and a first shaft disposed about the axis.

18 Claims, 6 Drawing Sheets

(51) Int. Cl.
*F02C 7/18* (2006.01)
*F16C 27/02* (2006.01)

(56) References Cited

U.S. PATENT DOCUMENTS

| | | | |
|---|---|---|---|
| 4,332,427 A * | 6/1982 | Sargent | F01D 25/164 384/100 |
| 5,544,700 A | 8/1996 | Shagoury | |
| 6,732,502 B2 | 5/2004 | Seda et al. | |
| 7,097,415 B2 | 8/2006 | Bart et al. | |
| 7,383,686 B2 | 6/2008 | Aycock et al. | |
| 7,409,819 B2 | 8/2008 | Henry | |
| 7,594,388 B2 | 9/2009 | Cherry et al. | |
| 7,624,580 B2 | 12/2009 | Fukutani | |
| 7,661,260 B2 | 2/2010 | Moniz et al. | |
| 7,708,519 B2 | 5/2010 | Mignano | |
| 7,870,742 B2 | 1/2011 | Lee et al. | |
| 7,870,743 B2 | 1/2011 | Lee et al. | |
| 8,191,352 B2 | 6/2012 | Schilling | |
| 8,251,830 B2 | 8/2012 | Schreiber et al. | |
| 8,641,366 B1 | 2/2014 | Ullah et al. | |
| 8,961,132 B2 | 2/2015 | Suciu et al. | |
| 2002/0073714 A1 * | 6/2002 | Yim | F01D 11/14 60/805 |
| 2005/0150970 A1 | 7/2005 | Beutin et al. | |
| 2012/0020596 A1 * | 1/2012 | Dupont | F16C 32/0622 384/107 |
| 2013/0192252 A1 * | 8/2013 | Ackermann | F01D 11/04 60/782 |
| 2016/0053808 A1 | 2/2016 | Garrison | |
| 2017/0122205 A1 | 5/2017 | Ertas et al. | |

OTHER PUBLICATIONS

Luo, Huageng et al.; "Synthesized Synchronous Sampling Technique for Differential Bearing Damage Detection", Journal of Engineering for Gas Turbines and Power, vol. 132, Issue: 7,pp. 8, Apr. 7, 2010.

Knezevici, D.D., et al.; "Measurements of Secondary Losses in a High-Lift Front-Loaded Turbine Cascade With the Implementation of Non-Axisymmetric Endwall Contouring", ASME Turbo Expo 2009: Power for Land, Sea, and Air, vol. 7, pp. 13, Jun. 8-12, 2009.

International Search Report and Written Opinion issued in connection with corresponding PCT Application No. PCT/US2017/037811, dated Sep. 14, 2017.

\* cited by examiner

SYSTEM AND METHOD FOR GAS BEARING SUPPORT OF TURBINE

BACKGROUND

The subject matter disclosed herein relates to gas bearings, and more particularly, to gas bearings for turbine engines.

Rotating components (e.g., shafts) of turbine engines may rotate at different speeds during operation. For example, a fan may rotate at a significantly lower speed than a turbine stage or a compressor stage. A gearbox may enable shafts of the turbine engine to rotate at different speeds. Rotational dynamics from a first shaft rotating at a desired speed may cause another shaft to rotate near or above a supercritical speed, thereby increasing bending stresses and bearing loads. Increased bending stresses and bearing loads may result in wear or failure of components of the turbine engine. A rotating shaft may supported by bearings at one or more points along its axis to affect the stiffness of the shaft, thereby reducing the bending stress on the shaft. However, limited space of the turbine engine system may restrict the quantity and placement of such bearings. Additionally, use of larger shafts to increase the stiffness may prohibitively increase the diameter and/or weight of the shaft.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a gas delivery disk coupled to a second shaft, wherein the second shaft and the gas delivery disk are disposed about an axis. The gas delivery disk includes an inner axial opening configured to facilitate a first axial flow through a first passage within the second shaft, a duct configured to supply a bearing flow in a radial direction toward the axis, and a bearing face disposed within the first passage and radially interior to the inner axial opening. The bearing face is configured to receive the bearing flow, and the bearing face is configured to form a gas bearing between the bearing face and a first shaft disposed about the axis.

In another embodiment, a system includes a first shaft disposed about an axis, a second shaft disposed about the axis and disposed concentrically about the first shaft, and a gas delivery disk coupled to the second shaft. The first shaft and the second shaft form a first passage therebetween. The gas delivery disk includes an inner axial opening configured to facilitate a first axial flow through the first passage, a plurality of ducts configured to supply a bearing flow in a radial direction toward the axis, and a bearing face disposed within the first passage and radially interior to the inner axial opening. The plurality of ducts is configured to extract the bearing flow from the second axial flow. The bearing face is configured to receive the bearing flow, and the bearing face is configured to form a gas bearing between the bearing face and the first shaft disposed about the axis.

In another embodiment, a method includes directing a first gas flow axially through a first passage and an inner axial opening of a gas delivery disk, directing a second gas flow axially through a second passage and a middle axial opening of a gas delivery disk, and directing a bearing flow radially through the gas delivery disk toward a first shaft. The first passage is disposed between the first shaft and a second shaft, the first shaft is disposed about an axis, and the second shaft is disposed about the axis. The second passage is disposed radially exterior to the second shaft. The gas delivery disk is configured to form a gas bearing between the gas delivery disk and the first shaft with the bearing flow.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas turbine engines utilize shafts to couple rotating components. For example, one or more turbine stages may drive one or more compressor stages. Some shafts are concentric, and may rotate counter to other shafts. The rotational speed and support of each shaft affects the load on the respective shaft. A shaft is supported by one or more bearings that may mitigate or reduce vibration amplitudes that may otherwise result from operating the shaft at various rotational speeds. Gas flows may be utilized within a gas turbine engine for various purposes including, but not limited to, combustion, dilution, cooling, gas bearings. Gas bearings described herein may be disposed in the gas turbine engine to support one or more shafts without blocking gas flows through the gas turbine engine. The gas bearings may mitigate or reduce vibration amplitudes that would otherwise result from operating the one or more shafts at higher rotational speeds. The gas bearings described herein may allow the shafts to operate at higher speeds while reducing shaft stresses and reducing or eliminating wear or instances of failure caused by such stresses. In some embodiments, the gas flows for the gas bearings may be supplied by the compressor of the turbine engine. Additionally, gas bearings may reduce or eliminate maintenance costs or contamination issues associated with oil bearings.

Figure 1:
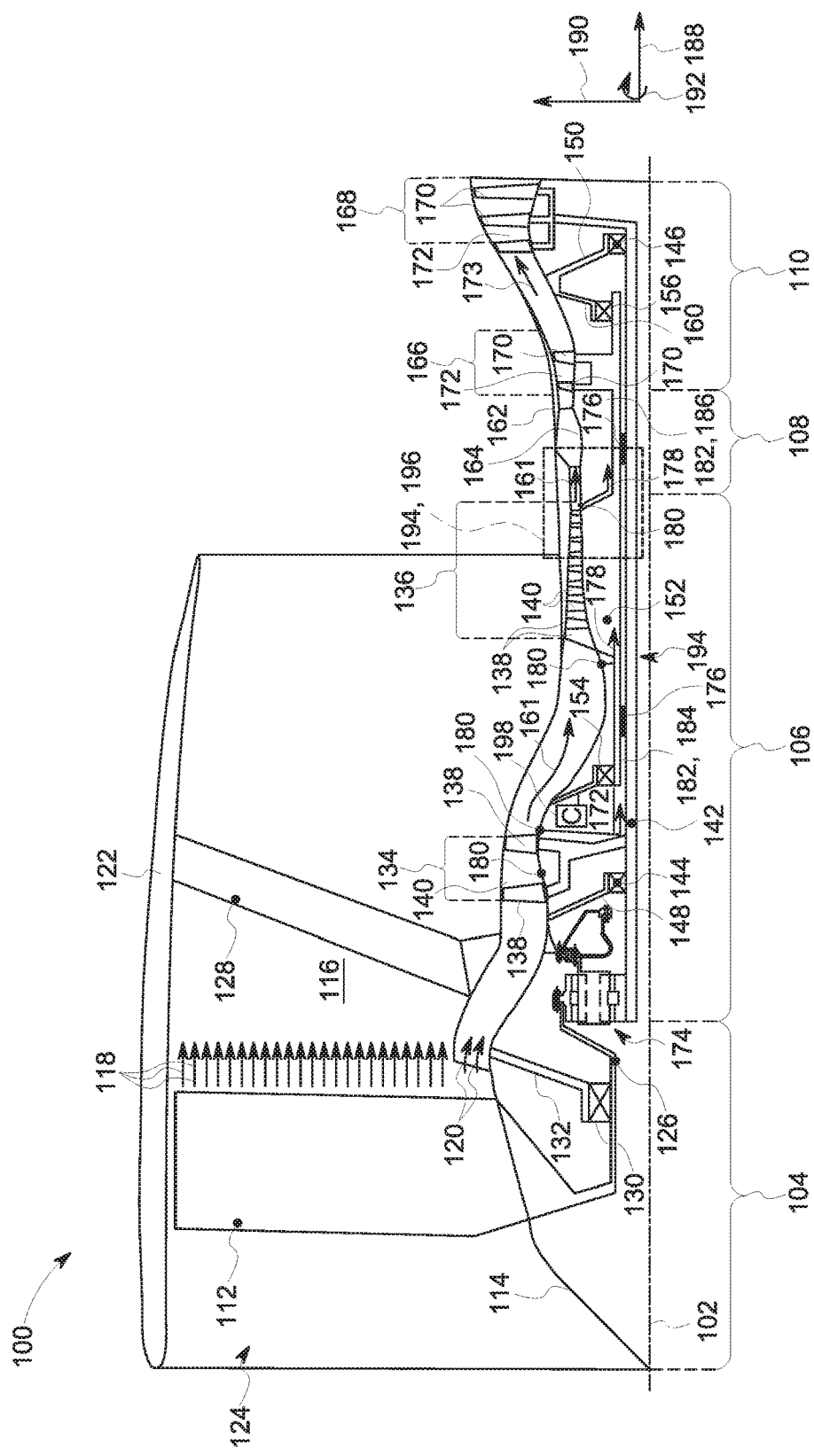
FIG. 1 is a cross-sectional view of an embodiment of a turbine engine with gas bearings.

FIG. 1 is a partial cross sectional view of an engine 100. In the exemplary embodiment, the engine 100 is a gas turbine engine suitable for use in, for example, aviation or marine applications. The engine 100 may be any other turbine engine and/or turbomachine, including, without limitation, a steam turbine engine, a centrifugal compressor, and a turbocharger. Although only a portion is shown, it is to be understood that the engine 100 may be annular in form, for example about an axis 102. In some embodiments, the engine 100 may generally include an air intake section 104, a compressor section 106, a combustion section 108 and a turbine section 110.

The air intake section 104 generally includes a fan 124 having a plurality of fan blades 112 coupled to a hub 114 and a rotatable fan shaft 126. One or more bearings 130 may be disposed between a stationary support 132 and the fan shaft 126 to facilitate rotation of the fan shaft 126 and/or to dampen vibrational energy imparted on the fan shaft 126 during operation of the engine 100. The one or more bearings 130 may be any type of bearings suitable for use within the engine 100, for example, such as rolling element bearings (e.g., ball bearings, roller bearings), gas bearings, journal bearings, or the like. In some embodiments, a casing 122 may be disposed about the fan 124 and at least a portion of the engine 100, thereby forming a passage 116 for a flow of air (e.g., bypass air) driven by the fan 124, such as indicated by arrows 118. In such embodiments, the casing 122 may be at least partially supported by a plurality of struts 128. In operation, the fan 124 draws air into the engine 100, directing the flow 118 of the air through the passage 116 and a compressor portion 120 of the air into the compressor section 106.

The compressor section 106 is mechanically and fluidly coupled to the air intake section 104 (e.g., fan section) and generally includes one or more compressor stages. For example, the compressor section may include a first compressor stage 134 (e.g., low pressure compressor stage) and a second compressor stage 136 (high pressure compressor stage), as shown in FIG. 1. Each compressor stage 134, 136 may have one or more blades 138 and one or more vanes 140.

The first compressor stage 134 receives the compressor portion 120 of the air from the air intake section 104 and compresses the air via a plurality of compressor blades 138 and compressor vanes 140. In some embodiments, the compressor blades 138 may be coupled to a first shaft (low pressure turbine (LPT) shaft) 142 to drive rotation of the compressor blades 138. One or more bearings (a first, or forward end low pressure turbine bearing 144 and a second, or aft end low pressure turbine bearing 146) may be disposed between one or more stationary supports 148, 150 and the LPT shaft 142 to facilitate rotation of the LPT shaft 142 and/or dampen vibrational energy imparted on the LPT shaft 142 during operation of the engine 100. The one or more bearings 144, 146 may be any type of bearings suitable for use within the engine 100, for example, such as rolling element bearings (e.g., ball bearings, roller bearings), gas bearings, journal bearings, or the like.

The second compressor stage 136 receives the compressor portion 120 of the air from the first compressor stage 134 and further compresses the air via a plurality of compressor blades 138 and compressor vanes 140. In some embodiments, the compressor blades 138 may be coupled to a high pressure turbine (HPT) shaft (core shaft) 152 to drive rotation of the compressor blades 138 of the second compressor stage 136. One or more bearings (a third, or forward end high pressure turbine bearing, 154 and a third, or aft end high pressure turbine bearing 156) may be disposed between one or more stationary supports 158, 160 and the HPT shaft 152 to facilitate rotation of the HPT shaft 152 and/or dampen vibrational energy imparted on the HPT shaft 152 during operation of the engine 100. The one or more bearings 154, 156 may be any type of bearings suitable for use within the engine 100, for example, such as rolling element bearings (e.g., ball bearings, roller bearings), gas bearings, journal bearings, or the like. Although only a limited number of compressor stages are shown in FIG. 1, it may be appreciated that any number of compressor stages may be present to facilitate suitable operation of the engine 100 for a desired application.

The combustion section 108 receives a primary portion 161 of the compressor portion 120 of the air from the second compressor stage 136, mixes the primary portion 161 with a fuel, and facilitates an ignition of the fuel/air mixture. The combustion section 108 generally includes a combustor 162 having a combustion chamber 164 mechanically and fluidly coupled to the compressor section 106 and to the turbine section 110. The combustor 162 may be any type of suitable combustor known in the art and may include any components (e.g., cowls, swirlers, nozzles, igniters, fuel injectors, or the like) required to facilitate the ignition of the fuel/air mixture as described above.

The turbine section 110 is mechanically and fluidly coupled to the combustion section 108 and generally includes one or more turbines stages, for example, such as a first turbine stage 166 (high pressure turbine stage) and second turbine stage 168 (low pressure turbine stage) as shown in FIG. 1. Although only a limited number of turbine stages are shown, it may be appreciated that any number of turbine stages may be present to facilitate suitable operation of the engine 100 for a desired application.

In some embodiments, the first turbine stage 166 and second turbine stage 168 each may include a plurality of turbine blades 170 and turbine nozzles 172. With respect to the first turbine stage 166, the turbine blades 170 may be coupled to the HPT shaft 152, which is coupled to the second compressor stage 136, as described above. In operation of such embodiments, the first turbine stage 166 receives the heated fuel/air mixture (e.g., combustion products 173) from the combustion section 108 and coverts at least a portion of the thermal energy (e.g., provided by ignition of the fuel/air mixture in the combustion chamber 164) into mechanical rotational energy via the plurality of turbine blades 170. The rotation of the turbine blades 170 causes the HPT shaft 152 to rotate, thereby causing the compressor blades 138 of the second compressor stage 136 to rotate.

With respect to the second turbine stage 168, the turbine blades 170 may be coupled to the LPT shaft 142, which is coupled to the first compressor stage 134, as described above. In some embodiments, the LPT shaft 142 may also be coupled to the fan shaft 126, for example, such as shown in FIG. 1. In operation, the second turbine stage 168 receives the heated fuel/air mixture (e.g., combustion products) from the first turbine stage 166 and coverts at least another portion of the thermal energy into mechanical rotational energy via the plurality of turbine blades 170. The rotation of the turbine blades 170 of the second turbine stage 168 causes the second shaft 152 and the fan shaft 126 to rotate, thereby causing the compressor blades 138 of the second compressor stage 136 and fan blades 112 of the fan 124 to rotate.

Although described above in the context of an engine 100 having a two spool configuration (e.g., a high pressure (HP) spool with one or more HP turbine stages 166 and one or more HP compressor stages 136, and low pressure (LP) spool with one or more LP turbine stages 168 and one or more LP compressor stages 134), it is to be understood that the engine 100 may have a three spool configuration having an intermediate spool (e.g., an intermediate spool with one or more intermediate turbine stages and one or more intermediate compressor stages). Additionally, in some embodiments, the engine 100 may have more than three spools with multiple intermediate spools.

In some embodiments, it may be desirable for separate components of the engine 100 to rotate at different speeds to perform a desired function. For example, the second turbine stage 168 may rotate during operation with a first rotational speed that is significantly higher that a second rotational speed of the fan 124. For example, in some embodiments, the second turbine stage 168 may have an operational first rotational speed of about 11,000 revolutions per minute (rpm), and the fan 124 may have an operational second rotational speed of about 2,400 to about 3000 rpm. Moreover, the first turbine stage 166 may rotate during operation with a third rotational speed that is higher than the first rotational speed of the second turbine stage 168. To accommodate for these differences in speed, in some embodiments, a gearbox 174 may be utilized to allow each of the components (e.g., the low pressure turbine stage 168, the high pressure turbine stage 166, and the fan 124) to operate at different speeds. In such embodiments, the gearbox 174 may couple the LPT shaft 142 to the fan shaft 126, for example, such as shown in FIG. 1. The gearbox 174 may be any type of gearbox suitable to facilitate coupling the LPT shaft 142 to the fan shaft 126 while allowing each of the second turbine stage 168 and fan 124 to operate at a desired speed. For example, in some embodiments, the gearbox 174 may be a reduction gearbox. Utilizing a reduction gearbox may enable the comparatively higher speed operation of the second turbine stage 168 while maintaining fan speeds sufficient to provide for increased air bypass ratios, thereby allowing for efficient operation of the engine 100. Moreover, utilizing a reduction gearbox may allow for a reduction in turbine stages that would otherwise be present (e.g., in direct drive engine configurations), thereby providing a reduction in weight and complexity of the engine.

In some embodiments, the gearbox 174 may be coupled to the HPT shaft 152, thereby enabling the HPT shaft 152 to drive the fan shaft 126 independent of the LPT shaft 142. In some embodiments, the gearbox 174 may couple the HPT shaft 152 to the LPT shaft 142, thereby enabling control of the rotational speed of the HPT shaft 152 relative to the rotational speed of the LPT shaft 142. Furthermore, in some embodiments, the HPT shaft 152 and the LPT shaft 142 are not coupled via the gearbox 174. That is, in some embodiments, the LPT shaft 142 is directly coupled to the fan shaft 126 without the gearbox so that the fan 124, the first compressor stage 134, and the second turbine stage 168 share the same rotational speed. During operation of the engine 100, the LPT shaft 142 may rotate in the same or different direction than the HPT shaft 152. That is, in some embodiments, the LPT shaft 142 and the HPT shaft 152 may be counter-rotating to one another. In some embodiments, the LPT shaft 142 may rotate at speeds of approximately 8,000 to 12,000 rpm. In some embodiments, the HPT shaft 152 may rotate at speeds of approximately 15,000 to 45,000 rpm, approximately 20,000 to 35,000 rpm, or approximately 25,000 to 30,000 rpm.

As discussed herein, a set of axes may be referenced. These axes are based on a cylindrical coordinate system and point in an axial direction 188, a radial direction 190, and a circumferential direction 192 relative to the axis 102. Moreover, it may be appreciated that the compressor section 106 is disposed upstream of the combustor section 108 and the turbine section 110 relative to the flow of the compressor portion 120 of the air through the engine 100.

The rotational speed of the LPT shaft 142 enabled by the gearbox 174 without sufficient support may be at or above a speed (e.g., third critical speed) that may result in an undesirable flexion or vibration of the LPT shaft 142. Without intending to be bound by theory, it is believed that, when operating at or above such a speed (e.g., "super critical"), vibrational nodes proximate the end bearing locations (e.g., the forward end low pressure turbine bearing 144 and/or aft end low pressure turbine bearing 146 described above) may be present, thereby generating a vibration mode of the LPT shaft 142 that may result in significant bending of the LPT shaft 142 and displacements proximate a center of the LPT shaft 142. As such, increasing the rotational speed of the LPT shaft 142 through such a speed (e.g., super critical speed) without sufficient support may increase shaft stresses and transient higher dynamic bearing loads, which may result in excessive wear, or premature failure of components of the engine 100.

As such, in some embodiments, the engine 100 may include one or more gas bearings 176 disposed along the LPT shaft 142. The inventors have observed that utilizing the one or more gas bearings 176 may mitigate or reduce vibration amplitudes that would otherwise result from the above described rotational speed of the LPT shaft 142. The one or more gas bearings 176 may reduce shaft stresses and reduce or eliminate wear or instances of failure caused by such stresses. The gas bearings 176 may be disposed at any location along the LPT shaft 142 suitable to provide one or more of the benefits as described herein. For example, in some embodiments, the gas bearings 176 may be positioned at any location between about 25 percent to about 75 percent of the axial length of the LPT shaft 142 as measured from the bearing 144.

Gas flows may be utilized within the engine 100 for various purposes including, but not limited to, combustion, dilution, cooling, and gas bearings. For example, a bleed flow 178 of the compressor portion 120 of the air into the compressor section 106 may be used within the engine 100 for dilution of the combustion products in the combustion section 108, for cooling of the turbine stages 166, 168, for formation of the gas bearings 176, or any combination thereof. The bleed flow 178 may be extracted from the compressor portion 120 at one or more points 180 along the compressor section 106, such as between compressor blades 138 of the low pressure compressor stage 134, between the low pressure compressor stage 134 and the high pressure compressor stage 136, between compressor blades 138 of the high pressure compressor stage 136, between the high pressure compressor stage 136 and the combustor 162, or any combination thereof. The bleed flow 178 extracted from each point 180 is directed through a conduit. In some embodiments, the bleed flow 178 may be extracted and directed through one or more conduits to passages 182 or cavities within the engine 100. For example, a low pressure passage 184 between the LPT shaft 142 and the HPT shaft 152 may receive a low pressure portion of the bleed flow 178. The low pressure portion of the bleed flow 178 may be routed through the low pressure passage 184 to supply a cooling flow to downstream components of the engine 100, such as to the turbine blades 170 and/or turbine vanes 172 of the second turbine stage 168, to the turbine casing, or to the turbine combustor 162. Moreover, a high pressure passage 186 radially outside the HPT shaft 152 may receive a high pressure portion of the bleed flow 178. The high pressure portion of the bleed flow 178 may be routed through the high pressure passage 186 to supply a cooling flow to downstream components of the engine 100, such as to the turbine blades 170 and/or turbine vanes 172 of the first turbine stage 166, to the turbine casing, or to the turbine combustor 162.

Gas flows (e.g., bleed flow 178) may be routed in an axial direction 188 within the engine 100, such as from a compressor stage 134, 136 to a turbine stage 166, 168. The gas bearings 176 of the engine 100 described in detail below are configured to support one or more rotating shafts (e.g., LPT shaft 142, HPT shaft 152) and to transfer loads (e.g., dynamic loads, static loads) to a frame of the engine 100 without obstructing or blocking axial gas flows through the engine 100. For example, a gas bearing assembly 194 may utilize a high pressure portion of the bleed flow 178 to supply the gas flow (e.g., bearing flow 212) for a combustion section gas bearing 196 in the low pressure passage 184 without blocking an axial flow of a low pressure portion of the bleed flow 178 through the low pressure passage 184. Additionally, the gas bearing assembly 194 may be configured to enable a remainder of the high pressure portion of the bleed flow 178 to flow in the axial direction 188 through the gas bearing assembly 194.

In some embodiments, a controller 198 may control the bleed flow 178 extracted from the compressor portion 120. The controller 198 may be coupled to the points 180 that extract the bleed flow 178, to the passages 182 that receive the bleed flow 178, or any combination thereof. For example, the controller 198 may control how much of the bleed flow 178 is extracted from the compressor portion 120 through control of valves, baffles, and so forth. Moreover, the controller 198 may control which passages 182 receive the one or more portions of the bleed flow 178. As may be appreciated, the controller 198 may have a memory to store instructions, and the controller 198 may have a processor coupled to the memory to execute the instructions to control the one or more portions of the bleed flow 178. While the controller 198 is illustrated between the passages of the compressor section 106, it may be appreciated that the controller 198 may be disposed at various positions throughout the engine 100 while coupled to components (e.g., valves, baffles) that control flows through the points 180 and/or passages 182.

Figure 2:
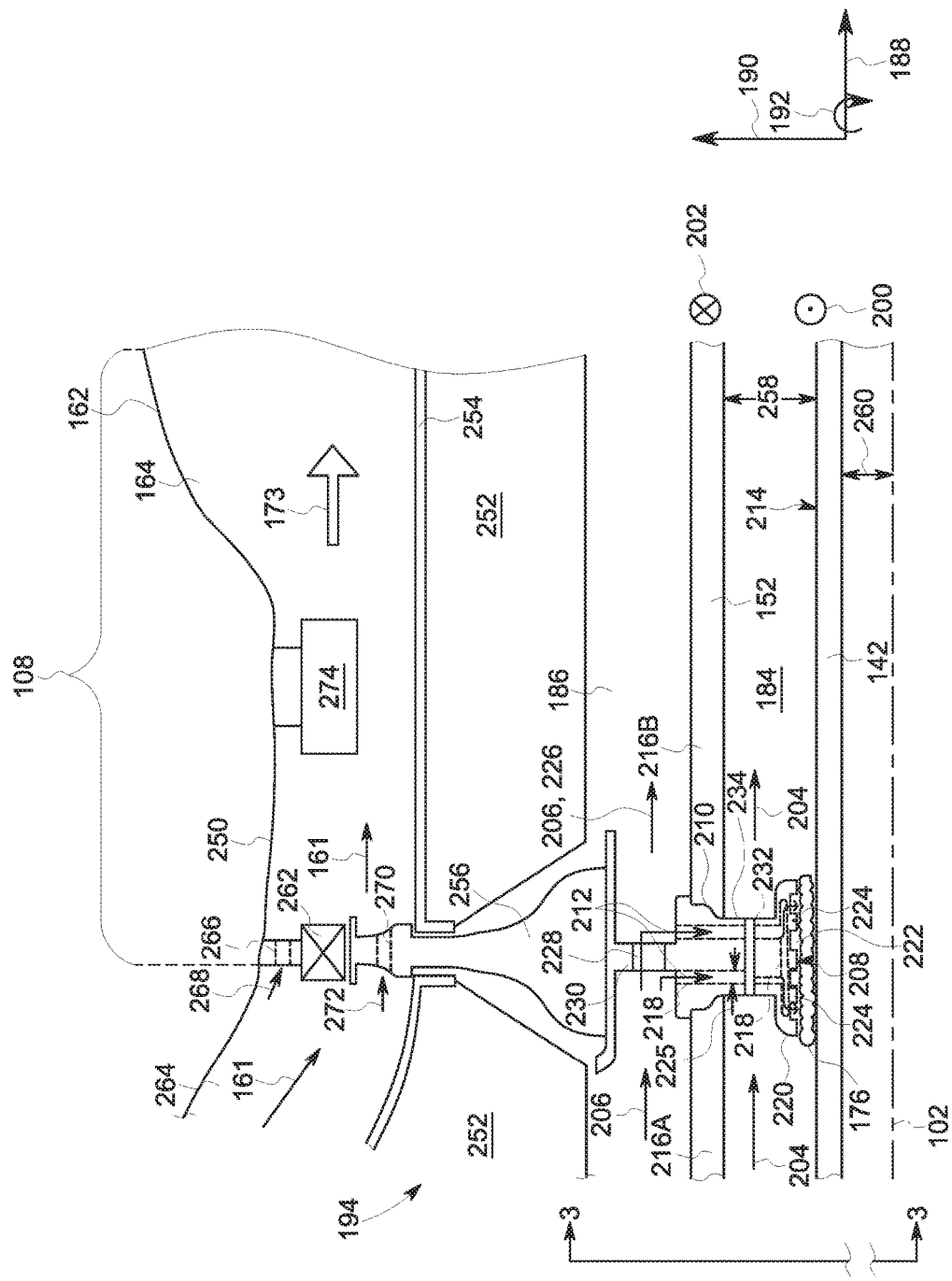
FIG. 2 is a cross-sectional view of an embodiment of a gas bearing assembly of the turbine engine.

FIG. 2 illustrates a cross-sectional view of an embodiment of the gas bearing assembly 194. The LPT shaft 142 rotates about the axis 102 in a first direction 200, and the HPT shaft 152 rotates about the axis 102 in a second direction 202. As discussed above, the first direction 200 and the second direction 202 may be the same or different according to the desired configuration and operation of the engine 100. A space (e.g., low pressure passage 184, first passage) between the LPT shaft 142 and the HPT shaft 152 may convey a first gas flow 204 in the axial direction 188. A passage (e.g., high pressure passage 186, second passage) may convey a second gas flow 206 in the axial direction 188. The HPT shaft 152 may separate the high pressure passage 186 from the low pressure passage 184. While FIG. 2 illustrates the first gas flow 204 and the second gas flow 206 in the downstream axial direction 188, in some embodiments, one or both of the first gas flow 204 and the second gas flow 206 may be in the upstream axial direction 188. Each of the first gas flow 204 and the second gas flow 206 may be respective portions of the bleed flow 178 extracted from the compressor portion 120 received in the compressor section 106. The first gas flow 204 may be extracted at a point 180 from the first compressor stage 134, a point 180 between the first compressor stage 134 and the second compressor stage 136, or some combination thereof. In some embodiments, the first gas flow 204 is configured to supply a cooling flow to the turbine blades 170 of the second turbine stage 168. The second gas flow 206 may be extracted at a point 180 from the second compressor stage 136, a point 180 between the second compressor stage 136 and the combustor 162, or some combination thereof. In some embodiments, the second gas flow 206 is configured to supply a cooling flow to the turbine blades 170 of the first turbine stage 168.

A gas delivery disk 210 may direct a bearing flow 212 toward a bearing surface of the LPT shaft 142 to form the gas bearing 176. The bearing surface of the LPT shaft 142 is a portion of an outer surface 214 of the LPT shaft 142 opposite a bearing face 208 of the gas delivery disk 210. In some embodiments, the gas delivery disk 210 couples segments 216 (e.g., upstream segment 216A, downstream segment 216B) of the HPT shaft 152. In some embodiments, the gas delivery disk 210 is an integral part of the HPT shaft 152. The gas delivery disk 210 directs the bearing flow 212 in the radial direction 190 through ducts 218 toward the axis 102 to form the gas bearing 176. While FIG. 2 illustrates the gas bearing 176 with a cloud outline between the bearing face 208 of the gas delivery disk 210 and the outer surface 214 of the LPT shaft 142, it may be appreciated that the gas bearing 176 may be a thin film or cushion of gas that extends circumferentially between the LPT shaft 142 and the bearing face 208. In some embodiments, the gas bearing 176 has a thickness of between 0.051 to 0.254 mm, approximately 0.102 to 0.191 mm, or approximately 0.152 mm (e.g., approximately 0.002 to 0.01 inches, approximately 0.004 to 0.0075 inches, or approximately 0.006 inches). Moreover, it may be appreciated that the relative placement and geometry of the illustrated gas bearing 176 and elements of the gas delivery disk 210 are shown for illustrative purposes and may not be shown to scale.

The bearing face 208 of the gas delivery disk 210 may have a foot 220 with one or more grooves 222 to receive the bearing flow 212 from the ducts 218. Each of the grooves 222 may extend at least partially about the foot 220 in the circumferential direction 192. The foot 220 may have multiple grooves 222 axially separated by sealing ridges 224. The sealing ridges 224 may reduce losses of the bearing flow 212 into the low pressure passage 184 with the first gas flow 204. That is, the sealing ridges 224 may axially retain a portion of the bearing flow 212 within the grooves 222 to form the gas bearing 176. The bearing flow 212 may be substantially retained within the one or more grooves 222 between the gas delivery disk 210 and the LPT shaft 142 to form an externally pressurized gas bearing 176. The bearing flow 212 that exits the gas bearing 176 may combine with the first gas flow 204 through the low pressure passage 184.

Figure 4:
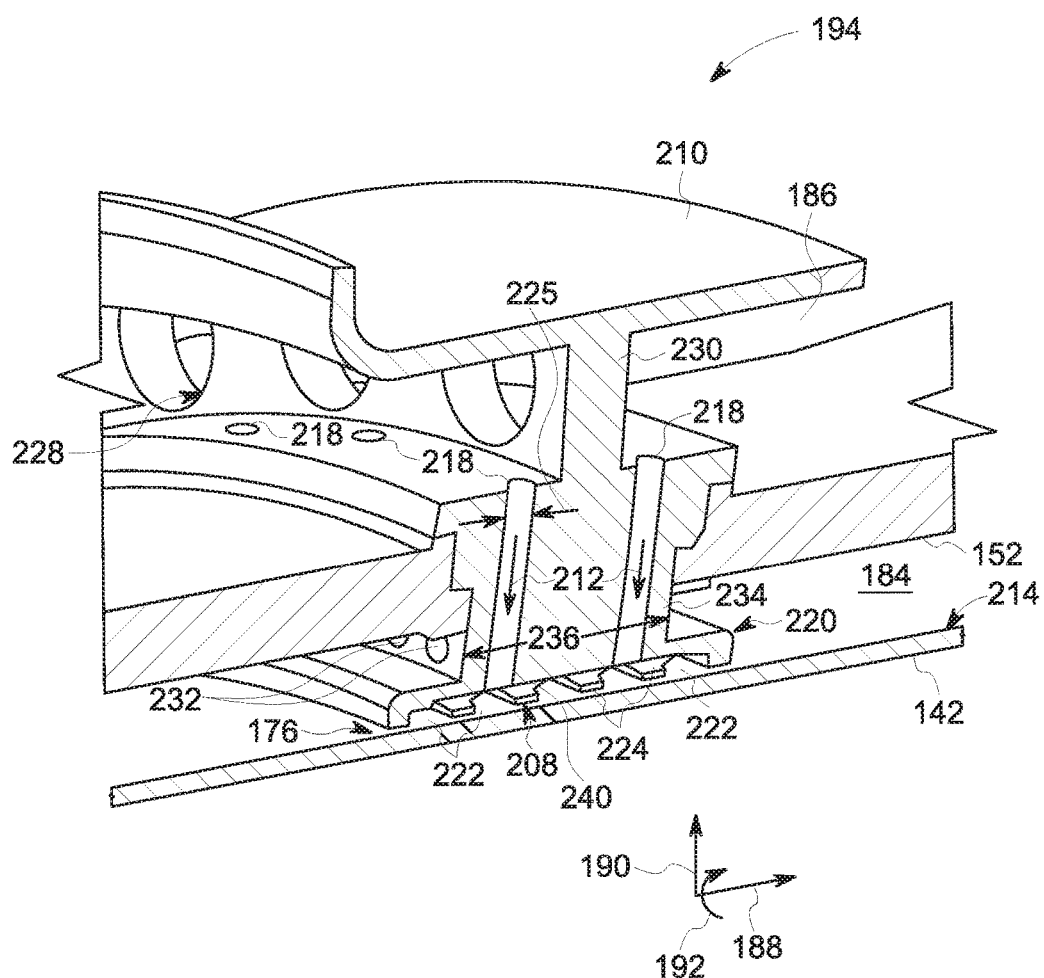
FIG. 4 is a perspective view of an embodiment of the gas delivery disk of the gas bearing assembly of FIG. 2.

The gas delivery disk 210 enables the passage of a remainder 226 of the second gas flow 206 (less the bearing flow 212) in the axial direction 188 through middle axial openings 228 of an outer body 230 of the gas delivery disk 210. The ducts 218 of the gas delivery disk 210 enable a fraction of the second gas flow 206 to be extracted as the bearing flow 212 in the radial direction 190. The ducts 218 may extract the bearing flow 212 upstream of the outer body 230, downstream of the outer body 230, or some combination thereof. The ducts 218 direct the bearing flow 212 to the grooves 222 of the foot 220. In some embodiments, the ducts 218 may include one or more axial pathways (e.g., distribution ducts 240) to distribute the bearing flow 212 among the grooves 222, as shown in FIGS. 2 and 4. The one or more axial distribution ducts 240 may be substantially parallel (e.g., within approximately 10 degrees) of the axis 102.

The greater pressure of the bearing flow 212 relative to the first gas flow 204 enables the formation of the gas bearing 176. In some embodiments, the second gas flow 206 and the bearing flow 212 are greater than the pressure of the first gas flow 204 by at least 344, 517, 689, 1034, 1379 kPa or more (e.g., 50, 75, 100, 150, or 200 psi or more). The bearing flow 212 may be a small fraction of the primary portion 161 of the compressor portion 120 of the air. For example, the bearing flow 212 may be less than 0.20, 0.15, or 0.10 percent or less of the primary portion 161 of the compressor portion 120 of the air. In some embodiments, a width 225 (e.g., diameter) of the ducts 218 supplying the bearing flow 212 may be less than approximately 12.7, 6.35, 5.08, 2.54, or 1.02 mm (e.g., 0.5, 0.25, 0.2, 0.1, or 0.04 inches).

Figure 3:
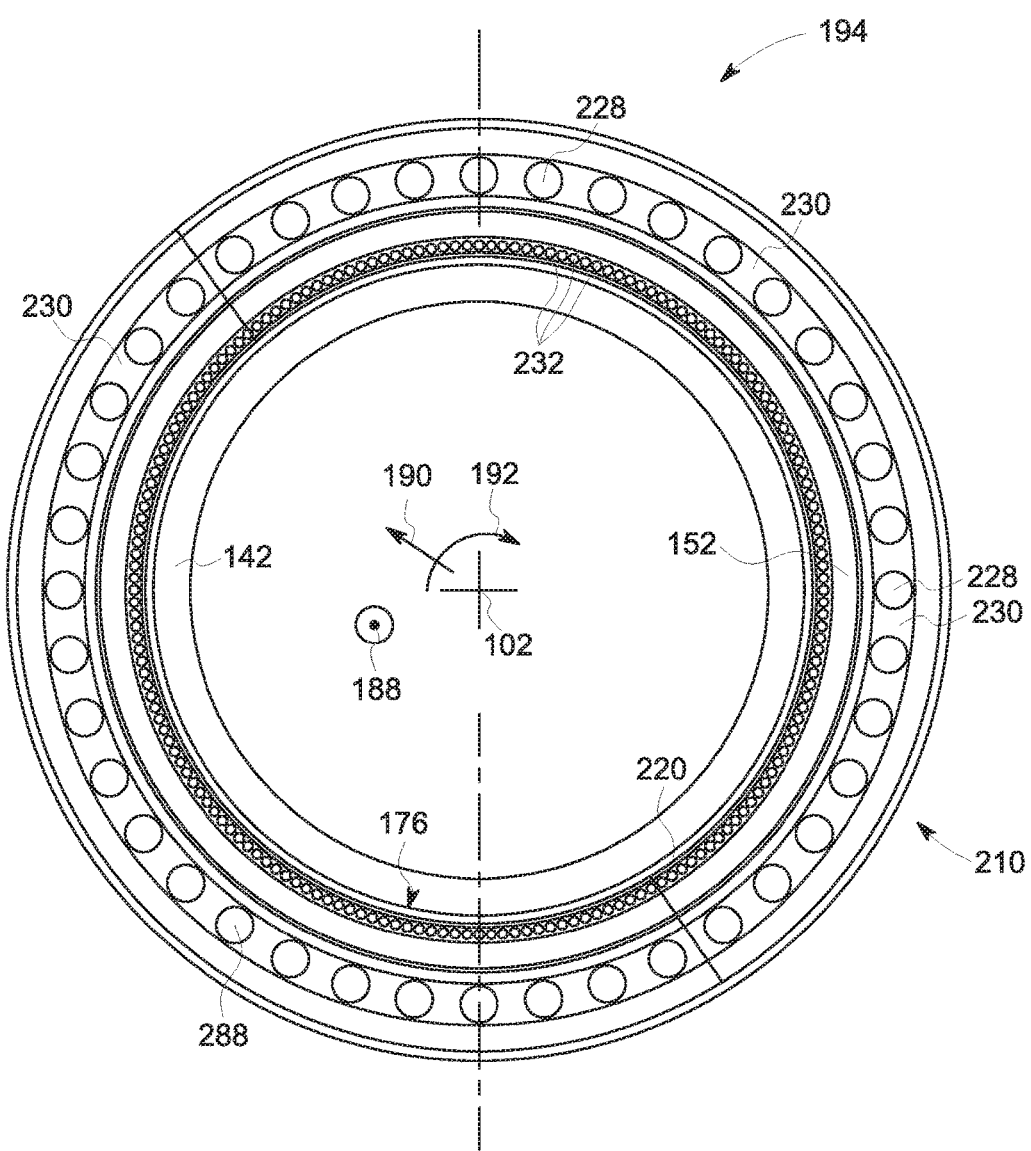
FIG. 3 is an axial view of an embodiment of a gas delivery disk of the gas bearing assembly of FIG. 2, taken along line 3-3.

The gas delivery disk 210 enables passage of the first gas flow 204 in the axial direction 188 through inner axial openings 232 of an inner body 234 of the gas delivery disk 210. The ducts 218 and the inner axial openings 232 of the gas delivery disk 210 are circumferentially offset, thereby enabling the supply of the bearing flow 212 in the radial direction 190 without interfering with or mixing with the first flow 204 in the axial direction 188. FIG. 3 illustrates an axial view of the gas delivery disk 210 with the HPT shaft 152 and the LPT shaft 142, taken along line 3-3 of FIG. 2. As described above, the gas delivery disk 210 extends in the circumferential direction 192 about the axis 102. While the gas delivery disk 210 is described as an integral disk extending circumferentially about the axis 102 fully, it may be appreciated that embodiments of the gas delivery disk 210 may be segmented. Additionally, or in the alternative, embodiments of the gas delivery disk 210 may be incomplete disks that extend less than 360 degrees about the axis 102.

The middle axial openings 228 and the inner axial openings 232 are spaced about the gas delivery disk 210 in the circumferential direction 192. While the inner axial openings 232 are shown in FIG. 3 to be uniformly spaced about the gas delivery disk 210, some embodiments may dispose the inner axial openings 232 differently to enable sufficient bearing flow 212 through the ducts 218 to circumferential regions of the gas bearing assembly 194. For example, if the volume of the second gas flow 206 at a top region of the high pressure passage 186 is greater than the volume of the second gas flow 206 at a bottom region of the high pressure passage 186, then the inner axial openings 232 in the bottom region may be circumferentially spaced greater than the inner axial openings 232 in the top region to accommodate more ducts 218 to supply the bearing flow 212.

FIG. 4 is a perspective view of an embodiment of the gas delivery disk 210 of the gas bearing assembly 194 of FIG. 2. As discussed above, the ducts 218 are circumferentially offset from the inner axial openings 232 of the inner body 234, thereby enabling the bearing flow 212 in the radial direction 190 to be isolated from the first gas flow 204 of the low pressure passage 184 through the inner axial openings 232 in the axial direction 188. In some embodiments, the quantity of ducts 218 extending radially through the gas delivery disk 210 may be less than or equal to the quantity of the middle axial openings 228 through the outer body 230. The inner body 234 has a first axial width 236, and the foot 220 has a second axial width 238. The second axial width 238 of the foot 220 may be greater than the first axial width 236 of the inner body 234. The second axial width 238 of the foot 220 may increase the stability of the gas bearing 176 and/or may reduce the losses of the bearing flow 212 through the gas bearing 176 during operation.

Returning to FIG. 2, the gas delivery disk 210 rotates with the HPT shaft 152 about the axis 102. Some components of the engine 100, such as a casing 250, a support frame 252, the combustor 162, a combustor liner 254, and so forth, are fixed relative to the axis 102. Such fixed components may provide structural support for the various rotating components (e.g., LPT shaft 142, HPT shaft 152) and bearings 130, 144, 146, 154, 156, 176 of the engine 100. An intermediate disk 256 coupled to the gas delivery disk 210 may transfer loads from the HPT shaft 152 and the gas bearing 176 to fixed components. Loads on the intermediate disk 256 may include static loads on the LPT shaft 142, static loads on the HPT shaft 152, dynamic loads on the LPT shaft 142, dynamic loads on the HPT shaft 152, or any combination thereof. The gas bearing 176 may maintain a separation distance 258 between the HPT shaft 152 and the LPT shaft 142. The separation distance 258 may be less than approximately 50, 25, 15, 10, or 5 percent of a radius 260 of the LPT shaft 142.

In some embodiments, the intermediate disk 256 may transfer the load the HPT shaft 152 and the gas bearing 176 to the casing 250 of the combustion section 108 of the engine 100. For example, the intermediate disk 256 may transfer the load to a damping member 262 coupled to the casing 250. The damping member 262 may include, but is not limited to, a gas bearing, a magnetic bearing, or a mechanical bearing (e.g., oil bearing). A portion of the intermediate disk 256 may extend through a compressor passage 264 that supplies the primary portion 161 of the air to the combustor section 108. In some embodiments, some of the primary portion 161 flows through the damping member 262 or a support 266, as shown by the arrow 268. Additionally, or in the alternative, some of the primary portion 161 flows through the axial openings 270 (e.g., outer axial openings) of the intermediate disk 256, as shown by the arrow 272. The primary portion 161 of air flows through the compressor passage 264 to one or more fuel nozzles 274 (e.g., diffusion fuel nozzles), which add fuel to the primary portion 161. The fuel and the primary portion 161 of the air mix and combust in the combustion chamber 164 to form the heated flow of combustion products 173, which may be directed to the turbine section 110 of the engine 100 as described above with FIG. 1.

Figure 5:
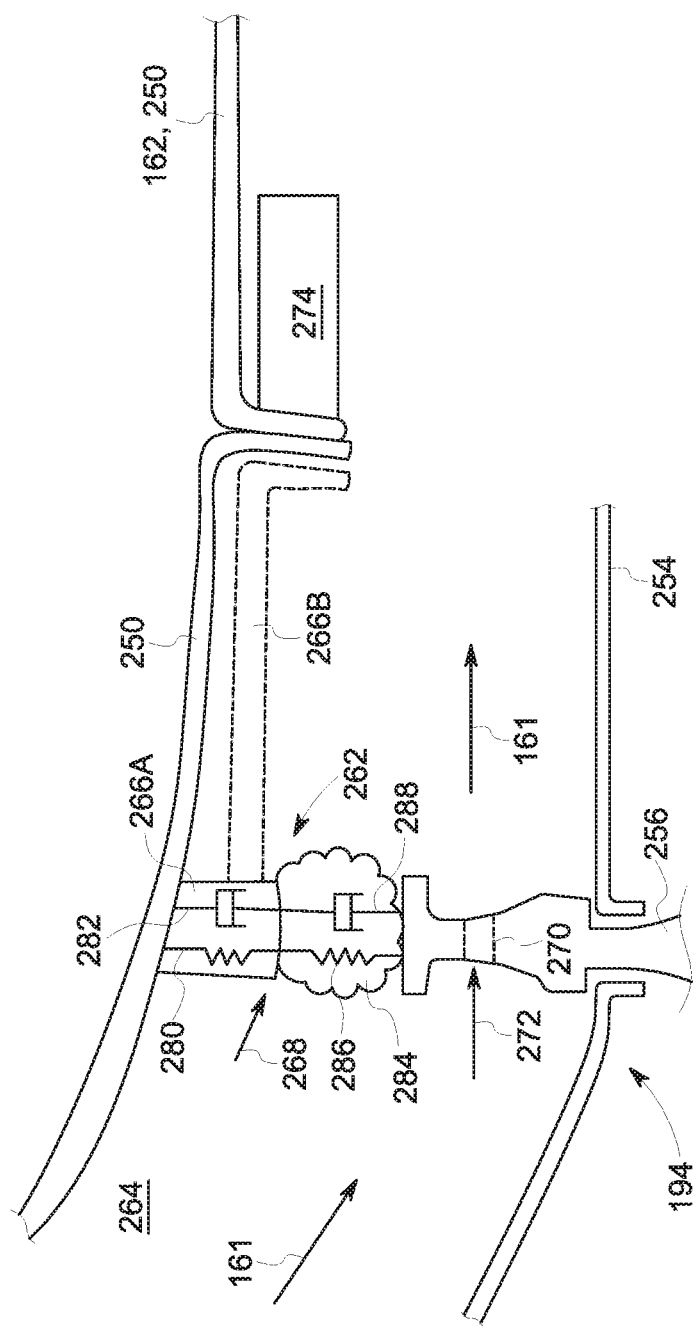
FIG. 5 is an embodiment of the gas bearing assembly of the turbine engine.

FIG. 5 illustrates an embodiment of the damping member 262 that transmits the load from the intermediate disk 256 to the casing 250. In some embodiments, the damping member 262 includes a support 266B coupled to the casing 250 via one or more of the fuel nozzles 274. The support 266B may be a cantilevered support, as shown by the dashed lines in FIG. 5. The support 266B may provide more flexibility or more damping than the support 266A coupled to the casing 250 separate from the fuel nozzles 274. The supports (e.g., 266A, 266B) may be characterized by a first stiffness 280 and a first damping 282. Where the damping member 262 utilizes a second gas bearing 284, the second gas bearing 284 may be characterized by a second stiffness 286 and a second damping 288. The damping value of the damping member 262 with the second gas bearing 284 may be understood to increase toward the value of the first damping 282 as a ratio of the second stiffness 286 (i.e., $K_{gas\ bearing}$) to the first stiffness 280 (i.e., $K_{support}$) increases. That is, as ($K_{gas\ bearing}/K_{support}$) increases, the equivalent damping value (i.e., $C_{eq}=C_{gas\ bearing}+C_{support}$) of the support 266 and the second gas bearing 284 together may be understood to approach the first damping 282 (i.e., $C_{support}$). Therefore, in some embodiments, a high damping value of the damping member 262 may be obtained with a support (e.g., 266A, 266B) having a high first damping 282 and a relatively low first stiffness 280 relative to the second stiffness 286 of the second gas bearing 284.

The gas to form the second gas bearing 284 may be supplied from one or more sources including, but not limited to the second gas flow 206, combustion products 173 from the turbine section 110 (e.g., first turbine stage 166), or from an external source. As may be appreciated, the gas supplied to form the second gas bearing 284 may be pressurized more than the primary portion 161 of the air through the compressor passage 264. The gas may be supplied through the intermediate disk 256 or through the support (e.g., 266A, 266B). The second gas bearing 284 enables the damping member 262 to be an oil-free damping member, thereby reducing or eliminating maintenance costs associated with a mechanical bearing (e.g., oil bearing).

Figure 6:
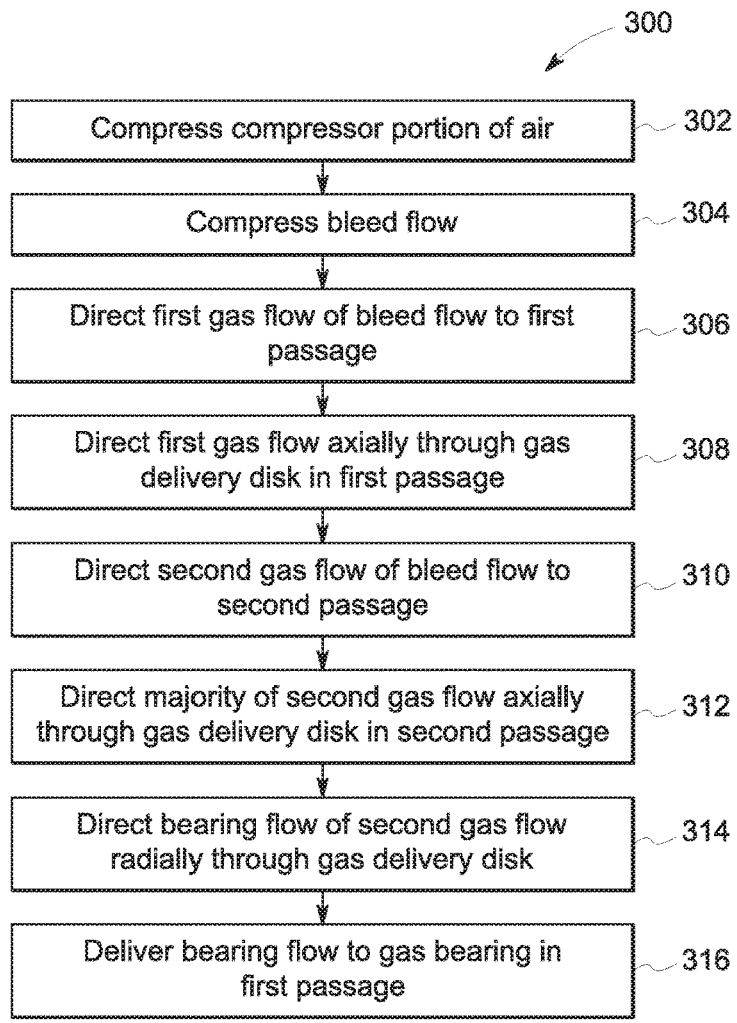
FIG. 6 is an embodiment of a method of directing airflows for a gas bearing assembly.

FIG. 6 illustrates a method 300 of forming the gas bearing 176 illustrated in FIGS. 1-4 and discussed above. The turbine engine 100 compresses (block 302) the compressor portion 120 of the air received by the turbine engine 100. The turbine engine 100 also compresses (block 304) the bleed flow 178. As discussed above, the bleed flow 178 is extracted from the compressor portion 120 at one or more points 180, such as within a compressor stage 134, 136, between compressor stages, or any combination thereof. As discussed above, the controller 198 may control the bleed flow 178 extracted from the compressor portion 120, and the controller 198 may control the passages that receive components of the bleed flow 178. One or more first conduits of the turbine engine 100 direct (block 306) the first gas flow 204 of the bleed flow 178 to a first passage 184. The first passage 184 may be a passage between the LPT shaft 142 and the HPT shaft 152. The first passage 184 directs (block 308) the first gas flow 204 to flow axially through the gas delivery disk 210. One or more second conduits of the turbine engine 100 direct (block 310) the second gas flow 206 of the bleed flow 178 to a second passage 186. The second passage 186 may be a passage radially outside the HPT shaft 152. As discussed above, the second gas flow 206 through the second passage 186 may have a greater pressure than the first gas flow 204 through the first passage 184.

The second passage 186 directs (block 312) a remainder 226 of the second gas flow 206 (less the bearing flow 212) axially through the gas delivery disk 210 in the second passage 186. Ducts 218 of the gas delivery disk 210 direct (block 314) the bearing flow 212 radially through the gas delivery disk 210. The ducts 218 of the gas delivery disk 210 enable the bearing flow 212 to pass through the HPT shaft 152 from the second passage 186 to the first passage 184. Moreover, the ducts 218 direct the bearing flow 212 radially through the gas delivery disk 210 without blocking or preventing the axial flow of the remainder 226 of the second gas flow 206 through the gas delivery disk 210. Additionally, the ducts 218 direct the bearing flow 212 radially through the gas delivery disk 210 without blocking or preventing the axial flow of the first gas flow 204 through the gas delivery disk 210. The ducts 218 deliver (block 316) the bearing flow 212 to the gas bearing 176 on the LPT shaft 142 in the first passage 184. At least some of the bearing flow 212 supplied to the gas bearing 176 exits into the first passage 184, thereby joining the first flow 204.

Figure 7:
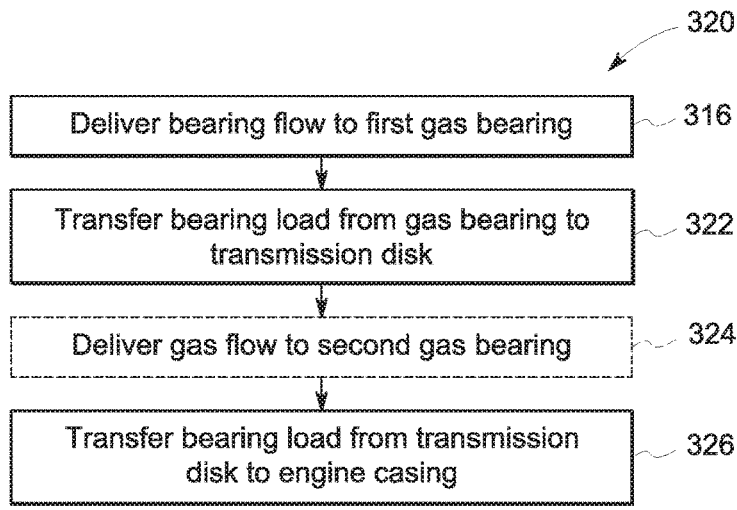
FIG. 7 is an embodiment of a method of transferring a load of on gas bearing to the turbine engine.

FIG. 7 illustrates a method 320 of transferring the load of the gas bearing 176 to the turbine engine 100. As noted above with FIG. 6, the gas delivery disk 210 delivers (block 316) the bearing flow 212 to the first gas bearing 176 between the LPT shaft and the HPT shaft. The gas bearing 176 transfers (block 322) the bearing load from the first gas bearing 176 to a transmission disk. The bearing load may include static loads on the LPT shaft 142, static loads on the HPT shaft 152, dynamic loads on the LPT shaft 142, dynamic loads on the HPT shaft 152, or any combination thereof. In some embodiments, the transmission disk may include the gas delivery disk 210 and the separate intermediate disk 256. In some embodiments, the transmission disk is the gas delivery disk 210 integrated with the intermediate disk 256.

Optionally, one or more conduits within the turbine engine 100 may deliver (block 324) a gas flow to a second gas bearing 284 opposite the first gas bearing 176. The gas flow to the second gas bearing 284 may be delivered through the transmission disk or through the frame of the turbine engine 100. The gas flow to the second gas bearing 284 may be supplied from one or more sources including, but not limited to the second gas flow 206, combustion products 173 from the turbine section 110 (e.g., first turbine stage 166), or from an external source.

The transmission disk transfers (block 326) the bearing load to the engine casing 250. In some embodiments, the transmission disk transfers the bearing load via the second gas bearing 284. Additionally, or in the alternative, the transmission disk transfers the bearing load via a magnetic bearing or a mechanical bearing (e.g., oil bearing). The transmission disk transfers the bearing load to a fixed component of the engine 100, such as the casing 250, the support frame 252, the combustor 162, the combustor liner 254, and so forth. A damping member 262 coupled to the fixed component may reduce or eliminate vibration of the transmission disk. Moreover, the one or more gas bearings 176, 284 and the support 266 may be selected to reduce or eliminate harmonic vibration of the transmission disk, the LPT shaft 142, or the HPT shaft 152, or any combination thereof, thereby reducing the stresses on the rotating components of the turbine engine 100.

Technical effects of the invention include utilizing a gas bearing to support rotating shafts of a turbine engine without blocking axial gas flows through the turbine engine. Additionally, the one or more gas bearings provide support for the rotating components without the maintenance time and costs associated with oil bearings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a gas delivery disk coupled to a second shaft, wherein the second shaft and the gas delivery disk are disposed about an axis, wherein the gas delivery disk comprises:
an inner axial opening configured to facilitate a first axial flow through a first passage within the second shaft;
a duct configured to supply a bearing flow in a radial direction toward the axis;
a bearing face disposed within the first passage and radially interior to the inner axial opening, wherein the bearing face is configured to receive the bearing flow, and the bearing face is configured to form a gas bearing between the bearing face and a first shaft disposed about the axis; and
wherein the gas delivery disk comprises a middle axial opening configured to facilitate a second axial flow through a second passage radially exterior to the second shaft, wherein the duct is configured to extract the bearing flow from the second axial flow.

2. The system of claim 1, wherein the gas delivery disk comprises a plurality of the inner axial openings configured to facilitate the first axial flow through the first passage within the second shaft.

3. The system of claim 1, wherein a second pressure of the second axial flow is greater than a first pressure of the first axial flow.

4. The system of claim 1, wherein the gas delivery disk comprises an outer body, the outer body comprises the middle axial opening, and the duct is configured to extract the bearing flow from the second axial flow upstream of the outer body.

5. The system of claim 1, wherein the gas delivery disk comprises an outer body, the outer body comprises the middle axial opening, and the duct is configured to extract the bearing flow from the second axial flow downstream of the outer body.

6. The system of claim 1, wherein the gas delivery disk comprises:
an inner body, wherein the inner body comprises a first axial width and the inner axial opening; and
a foot, wherein the foot comprises the bearing face and a second axial width, and the second axial width is greater than the first axial width of the inner body.

7. The system of claim 1, wherein the bearing face comprises at least one groove and a plurality of ridges, wherein the at least one groove is configured to receive the bearing flow, and the plurality of ridges is configured to axially retain a portion of the bearing flow within the at least one groove to form the gas bearing.

8. The system of claim 7, wherein the bearing face comprises a plurality of the grooves, and the gas delivery disk comprises a distribution duct coupled to the duct and to the plurality of the grooves, wherein the distribution duct is parallel to the axis.

9. The system of claim 1, comprising a turbine engine, wherein the turbine engine comprises the first shaft and the second shaft, and the gas delivery disk is disposed about the first shaft at a location between 25 to 75 percent of an axial length of the first shaft.

10. The system of claim 9, wherein the turbine engine comprises a combustor section, and the location of the gas delivery disk is configured to transfer loads from the gas bearing to the combustor section.

11. A system comprising:
a first shaft disposed about an axis;
a second shaft disposed about the axis and disposed concentrically about the first shaft, wherein the first shaft and the second shaft form a first passage therebetween; and
a gas delivery disk coupled to the second shaft, wherein the gas delivery disk comprises:
an inner axial opening configured to facilitate a first axial flow through the first passage;
a plurality of ducts configured to supply a bearing flow in a radial direction toward the axis, wherein the plurality of ducts is configured to extract the bearing flow from a second axial flow;
a bearing face disposed within the first passage and radially interior to the inner axial opening, wherein the bearing face is configured to receive the bearing flow, and the bearing face is configured to form a gas bearing between the bearing face and the first shaft disposed about the axis; and
wherein the gas delivery disk comprises a middle axial opening configured to facilitate the second axial flow through a second passage radially exterior to the second shaft.

12. The system of claim 11, wherein the first shaft is coupled to a first compressor stage, the second shaft is coupled to a second compressor stage, and a second pressure of a second airflow from the second compressor stage is greater than a first pressure of a first airflow from the first compressor stage.

13. The system of claim 12, wherein the first shaft is coupled to a low pressure turbine stage, and the second shaft is coupled to a high pressure turbine stage, wherein the second shaft is configured to rotate about the axis at a greater speed than the first shaft.

14. The system of claim 11, wherein the first shaft is configured to rotate counter to the second shaft.

15. The system of claim 11, wherein at least one of the first axial flow and the second axial flow comprises a cooling flow configured to cool a turbine stage of the system, a dilution flow configured to dilute combustion products of the system, or any combination thereof.

16. A method comprising:
directing a first gas flow axially through a first passage and an inner axial opening of a gas delivery disk, wherein the first passage is disposed between a first shaft and a second shaft, the first shaft is disposed about an axis, and the second shaft is disposed about the axis;
directing a second gas flow axially through a second passage and a middle axial opening of a gas delivery disk, wherein the second passage is disposed radially exterior to the second shaft; and
directing a bearing flow radially through the gas delivery disk toward the first shaft, wherein the gas delivery disk is configured to form a gas bearing between the gas delivery disk and the first shaft with the bearing flow.

17. The method of claim 16, wherein the bearing flow is extracted from the second gas flow.

18. The method of claim 17, wherein the gas delivery disk comprises a plurality of ducts configured to extract the bearing flow, and the bearing flow through the plurality of ducts is isolated from the first gas flow axially through the inner axial opening.

* * * * *